(12) United States Patent
Gao

(10) Patent No.: US 8,760,076 B2
(45) Date of Patent: Jun. 24, 2014

(54) PWM DIMMING CIRCUIT WITH MULTIPLE OUTPUTTING PATHS OF CURRENT FOR MULTIPLE LED STRINGS

(75) Inventor: Xinming Gao, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 223 days.

(21) Appl. No.: 13/379,738

(22) PCT Filed: Oct. 18, 2011

(86) PCT No.: PCT/CN2011/080948
§ 371 (c)(1),
(2), (4) Date: Dec. 21, 2011

(87) PCT Pub. No.: WO2013/010351
PCT Pub. Date: Jan. 24, 2013

(65) Prior Publication Data
US 2013/0015780 A1    Jan. 17, 2013

(30) Foreign Application Priority Data

Jul. 15, 2011   (CN) .......................... 2011 1 0199395

(51) Int. Cl.
*H05B 37/02* (2006.01)
(52) U.S. Cl.
CPC .............. *H05B 37/02* (2013.01); *Y10S 362/80* (2013.01)
USPC ........... 315/294; 315/312; 315/315; 315/318; 315/320; 362/227; 362/236; 362/800
(58) Field of Classification Search
CPC ......... H05B 37/02; H05B 39/04; H05B 41/36
USPC ........... 315/294, 307, 185 R, 82, 87, 88, 102, 315/167, 291, 308, 345, 312, 151, 158, 224, 315/149, 216, 315, 318, 320; 362/227, 236, 362/800, 806
See application file for complete search history.

(56) References Cited

U.S. PATENT DOCUMENTS 6,621,235 B2 * 9/2003 Chang ............................ 315/216
8,148,903 B2 * 4/2012 Pang ............................. 315/151

FOREIGN PATENT DOCUMENTS

| CN | 101409967 A | 4/2009 |
| CN | 102111932 A | 6/2011 |

OTHER PUBLICATIONS

Office Action for Priority Application No. 201110199395.9.

*Primary Examiner* — Douglas W Owens
*Assistant Examiner* — Borna Alaeddini

(57) ABSTRACT

A pulse width modulation (PWM) dimming circuit comprises a switch unit, a current generation unit, a mirror current source, a multi-path output unit, a plurality of current balance units and a plurality of LED lamp strings. The switch unit receives a PWM signal which controls the switch on or off. The current generation unit is connected with the switch unit and generates a current of a predetermined magnitude when the switch unit is on. The mirror current source is connected with the current generation unit and receives the current to generate a mirror current. The multi-path output unit is connected with the mirror current source and receives and output the mirror current in multiple paths. The current balance units are connected between the multi-path output unit and the LED lamp strings respectively. The PWM dimming circuit decreases both the difficulty and the manufacturing cost and is easy to operate.

18 Claims, 2 Drawing Sheets

PWM DIMMING CIRCUIT WITH MULTIPLE OUTPUTTING PATHS OF CURRENT FOR MULTIPLE LED STRINGS

BACKGROUND

1. Technical Field

The present disclosure relates to pulse width modulation (PWM) dimming technologies, and more particularly, to a PWM dimming circuit.

2. Description of Related Art

Currently, there are mainly three kinds of dimming technologies: PWM dimming, analog dimming and digital dimming. Many light emitting diode (LED) drivers on the market can support one or more of the dimming technologies. The PWM dimming is a dimming technology that utilizes simple digital pulses to switch on and off a white-light LED driver repeatedly. By use of the PWM dimming technology, the output current can be changed by simply providing digital pulses of different widths so as to adjust brightness of the white-light LED.

In conventional LED driving circuits, a balance integrated circuit (IC) is usually used for PWM dimming or analog dimming. Specifically, brightness of the LED is adjusted by using an internal module of the balance IC to adjust a duty ratio of the output current. Usually, the balance IC has a very complex circuit and requires use of a corresponding dimming module in the balance IC. The dimming module mainly functions to multiply an input PWM signal with a driving signal of a MOSFET which is used for current balance so that the MOSFET switches on or off according to the PWM signal to make a duty ratio of the LED consistent with that of the PWM signal. In this way, the PWM dimming or analog dimming can be achieved. However, this adds to both difficulty in design of the circuit and the manufacturing cost.

BRIEF SUMMARY

The primary objective of the present disclosure is to provide a PWM dimming circuit which has a simplified circuit design and reduced manufacturing cost.

To achieve the aforesaid objective, the present disclosure provides a PWM dimming circuit, including a switch unit, a current generation unit, a mirror current source, a multi-path output unit, a plurality of current balance units and a plurality of LED lamp strings. The switch unit is configured to receive a PWM signal and is controlled to turn on or off by the PWM signal; the current generation unit is connected with the switch unit and is configured to generate a current of a predetermined magnitude when the switch unit is turned on; the mirror current source is connected with the current generation unit and is configured to receive the current generated by the current generation unit and to generate a mirror current; the multi-path output unit is connected with the mirror current source and is configured to receive the mirror current and output the mirror current in multiple paths; the number of the current balance units is equal to that of the LED lamp strings, and the plurality of current balance units are connected between the multi-path output unit and the plurality of LED lamp strings respectively and are configured to adjust respective resistances to keep balance of currents among the LED lamp strings.

Preferably, the switch unit is a metal oxide semiconductor (MOS) transistor or a relay.

Preferably, the switch unit is an MOS transistor (11) which has a gate for receiving the PWM signal, a drain connected with the current generation unit, and a source connected to the ground.

Preferably, the current generation unit includes a resistor (RSET), an operational amplifier (OP1) and an MOS transistor (Q1); the resistor (RSET) has one end thereof connected to the switch unit and the other end thereof connected to an inverting input terminal of the operational amplifier (OP1) and a source of the MOS transistor (Q1); the operational amplifier (OP1) has a positive input terminal connected to a first reference voltage and an output terminal connected to a gate of the MOS transistor (Q1); and the MOS transistor (Q1) has a drain connected to the mirror current source.

Preferably, the mirror current source includes an MOS transistor (Q2) and an MOS transistor (Q3); the MOS transistor (Q2) has a drain connected to the drain of the MOS transistor (Q1); the MOS transistor (Q2) has a source and a gate connected to a source and a gate of the MOS transistor (Q3) respectively; the MOS transistor (Q3) has a drain connected to the multi-path output unit; and the drain and the gate of the MOS transistor (Q2) are connected together through a conductor.

Preferably, the multi-path output unit includes an operational amplifier (OP2), an MOS transistor (Q4) and a plurality of MOS transistors (Q6); an inverting input terminal of the operational amplifier (OP2) and a drain of the MOS transistor (Q4) are connected to the drain of the MOS transistor (Q3) respectively; an output terminal of the operational amplifier (OP2) is connected to gates of the MOS transistor (Q4) and the plurality of MOS transistors (Q6) respectively; a positive input terminal of the operational amplifier (OP2) is connected to a second reference voltage; a source of the MOS transistor (Q4) and sources of the plurality of MOS transistors (Q6) are connected to the source of the MOS transistor (11) in the switch unit respectively; and the number of the MOS transistors (Q6) is equal to that of the current balance units, and the plurality of MOS transistors (Q6) have respective drains connected to the plurality of current balance units respectively.

Preferably, each of the current balance units includes an MOS transistor (Q5) and an operational amplifier (OP3); an inverting input terminal of the operational amplifier (OP3) and a source of the MOS transistor (Q5) are connected to the drain of one of the MOS transistors (Q6), and an output terminal of the operational amplifier (OP3) is connected to a gate of the MOS transistor (Q5); and a positive input terminal of the operational amplifier (OP3) is connected to the second reference voltage, and a drain of the MOS transistor (Q5) is connected to one of the LED lamp strings.

Preferably, the MOS transistors (11), (Q1), (Q2), (Q3), (Q4), (Q5) and (Q6) are all NMOS transistors.

Preferably, the first reference voltage is 1.2 V and the second reference voltage is 0.3 V.

Preferably, the PWM dimming circuit is an integrated circuit (IC), and the source of the MOS transistor (Q1) is a reset terminal of the IC.

The present disclosure further provides a PWM dimming circuit, including a switch unit, a current generation unit, a mirror current source, a multi-path output unit, a plurality of current balance units and a plurality of LED lamp strings. The switch unit is an MOS transistor (11) which has a gate for receiving a PWM signal, a drain connected with the current generation unit, and a source connected to the ground, and the switch unit is controlled to turn on or off by the PWM signal; the current generation unit is connected with the switch unit and is configured to generate a current of a predetermined magnitude when the switch unit is turned on; the mirror current source is connected with the current generation unit and is configured to receive the current generated by the current generation unit and to generate a mirror current; the multi-path current output unit is connected with the mirror current source and is configured to receive the mirror current and output the mirror current in multiple paths; the number of the current balance units is equal to that of the LED lamp strings, and the plurality of current balance units are connected between the multi-path output unit and the plurality of LED lamp strings respectively and are configured to adjust respective resistances to keep balance of currents among the LED lamp strings.

Preferably, the current generation unit includes a resistor (RSET), an operational amplifier (OP1) and an MOS transistor (Q1); the resistor (RSET) has one end thereof connected to the switch unit and the other end thereof connected to an inverting input terminal of the operational amplifier (OP1) and a source of the MOS transistor (Q1); the operational amplifier (OP1) has a positive input terminal connected to a first reference voltage and an output terminal connected to a gate of the MOS transistor (Q1); and the MOS transistor (Q1) has a drain connected to the mirror current source.

Preferably, the mirror current source includes an MOS transistor (Q2) and an MOS transistor (Q3); the MOS transistor (Q2) has a drain connected to the drain of the MOS transistor (Q1); the MOS transistor (Q2) has a source and a gate connected to a source and a gate of the MOS transistor (Q3) respectively; the MOS transistor (Q3) has a drain connected to the multi-path output unit; and the drain and the gate of the MOS transistor (Q2) are connected together through a conductor.

Preferably, the multi-path output unit includes an operational amplifier (OP2), an MOS transistor (Q4) and a plurality of MOS transistors (Q6); an inverting input terminal of the operational amplifier (OP2) and a drain of the MOS transistor (Q4) are connected to the drain of the MOS transistor (Q3) respectively; an output terminal of the operational amplifier (OP2) is connected to gates of the MOS transistor (Q4) and the plurality of MOS transistors (Q6) respectively; a positive input terminal of the operational amplifier (OP2) is connected to a second reference voltage; a source of the MOS transistor (Q4) and sources of the plurality of MOS transistors (Q6) are connected to the source of the MOS transistor (11) in the switch unit respectively; and the number of the MOS transistors (Q6) is equal to that of the current balance units, and the plurality of MOS transistors (Q6) have respective drains connected to the plurality of current balance units respectively.

Preferably, each of the current balance units includes an MOS transistor (Q5) and an operational amplifier (OP3); an inverting input terminal of the operational amplifier (OP3) and a source of the MOS transistor (Q5) are connected to the drain of one of the MOS transistors (Q6), and an output terminal of the operational amplifier (OP3) is connected to a gate of the MOS transistor (Q5); and a positive input terminal of the operational amplifier (OP3) is connected to the second reference voltage, and a drain of the MOS transistor (Q5) is connected to one of the LED lamp strings.

Preferably, the MOS transistors (11), (Q1), (Q2), (Q3), (Q4), (Q5) and (Q6) are all NMOS transistors.

Preferably, the first reference voltage is 1.2 V and the second reference voltage is 0.3 V.

Preferably, the PWM dimming circuit is an integrated circuit (IC), and the source of the MOS transistor (Q1) is a reset terminal of the IC.

According to the PWM dimming circuit of the present disclosure, dimming of an LED lamp string is achieved through use of a simple circuit without having to use the dimming module as in the prior art. This decreases both the difficulty in design of the circuit and the manufacturing cost.

Hereinafter, implementations, functional features and advantages of the present disclosure will be further described with reference to embodiments thereof and the attached drawings.

DETAILED DESCRIPTION

It shall be understood that, the embodiments described herein are only intended to illustrate but not to limit the present disclosure.

Figure 1:
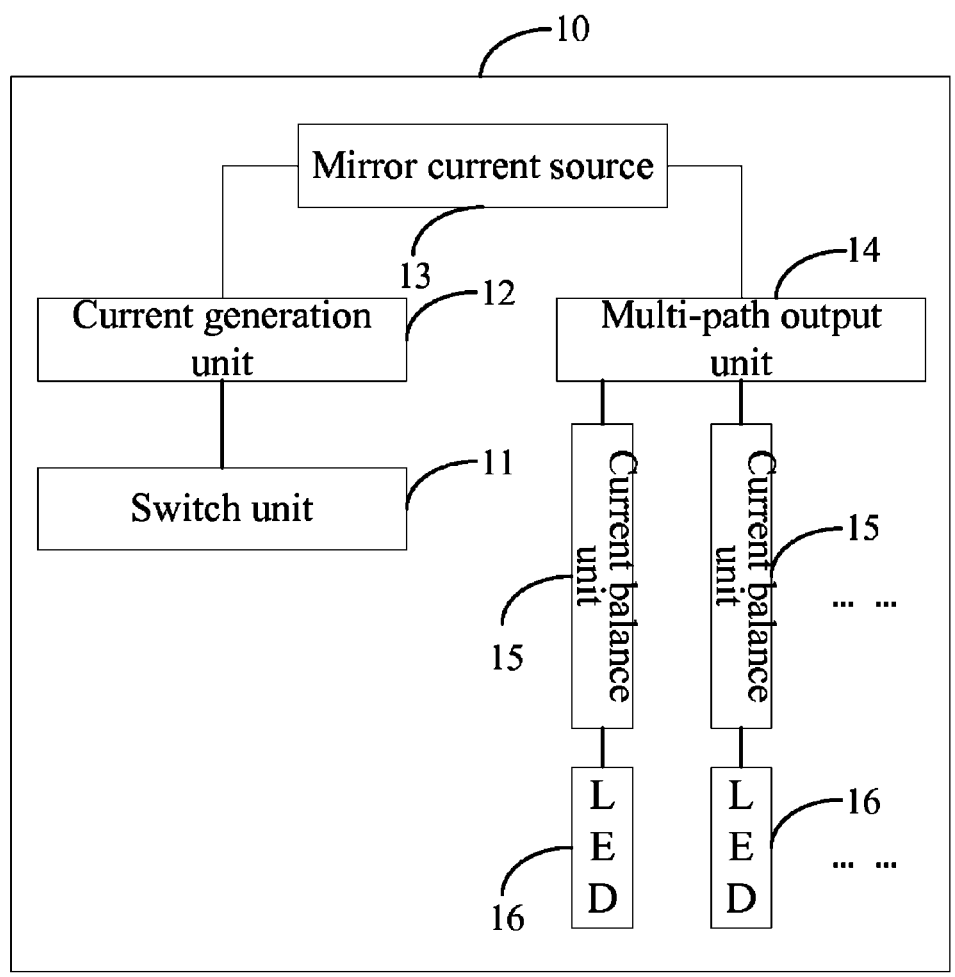
FIG. 1 is a schematic structural view of a first embodiment of a PWM dimming circuit according to the present disclosure.

Referring to FIG. 1, there is shown a schematic structural view of a PWM dimming circuit 10 of a first embodiment according to the present disclosure. The PWM dimming circuit 10 includes a switch unit 11, a current generation unit 12, a mirror current source 13, a multi-path output unit 14, a plurality of current balance units 15 and a plurality of LED lamp strings 16. The switch unit 11 is configured to receive a PWM signal and is controlled to turn on or off by the PWM signal so as to adjust a duty ratio of the current passing through an LED lamp string 16. The current generation unit 12 is connected with the switch unit 11 and is configured to generate a current of a predetermined magnitude when the switch unit 11 is turned on. The mirror current source 13 is connected with the current generation unit 12 and is configured to receive the current generated by the current generation unit 12 and to generate a mirror current. The multi-path output unit 14 is connected with the mirror current source 13 and is configured to receive the mirror current and output the mirror current in multiple paths. The number of the current balance units 15 is equal to that of the LED lamp strings 16. The plurality of current balance units 15 are connected between the multi-path output unit 14 and the plurality of LED lamp strings 16 respectively and are configured to adjust respective resistances to keep balance of currents among the LED lamp strings 16.

The PWM dimming circuit 10 can be used in an LED driving circuit and is connected to a PWM signal generation circuit (not shown). By adjusting a duty ratio of the PWM signal, the PWM dimming circuit 10 can adjust a duty ratio of the current generated by the current generation unit 12 so as to adjust a duty ratio of the mirror current. Consequently, a duty ratio of the current passing through the LED lamp strings 16 can be adjusted to achieve the purpose of PWM dimming.

Figure 2:
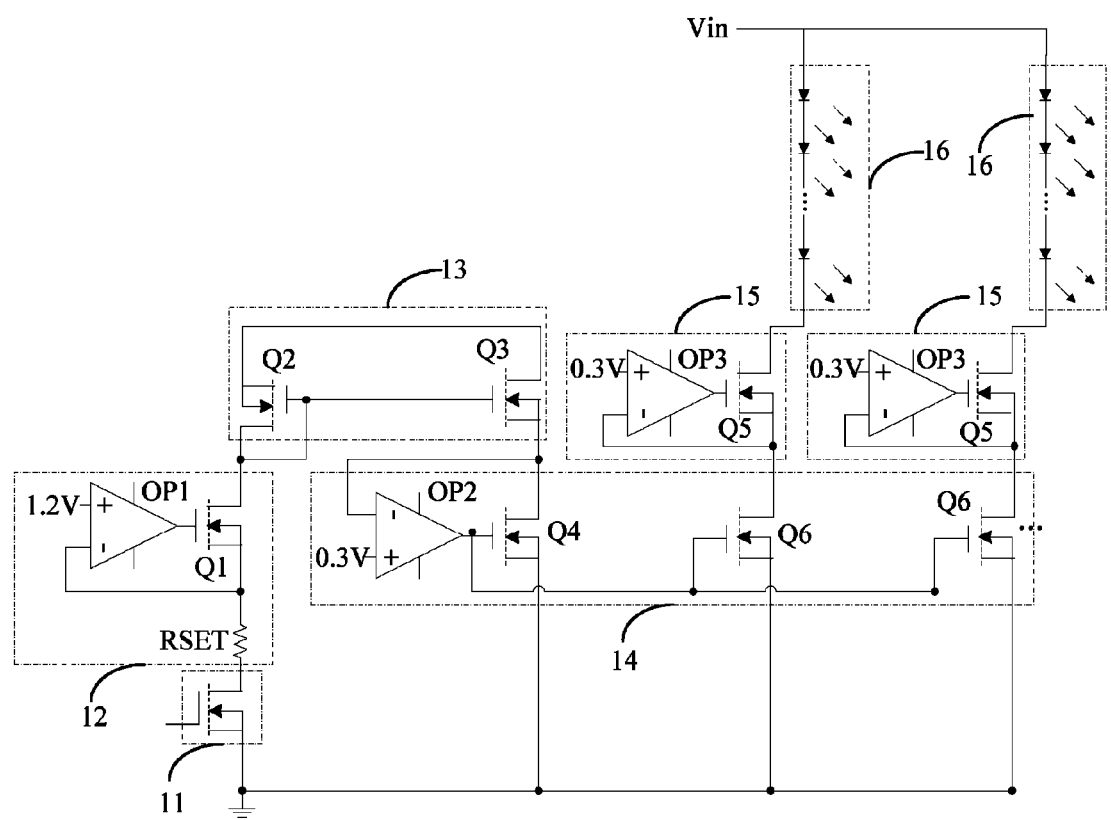
FIG. 2 is a detailed circuit diagram of the PWM dimming circuit of the first embodiment.

Referring to FIG. 2, there is shown a detailed circuit diagram of the PWM dimming circuit of the first embodiment. The switch unit 11 is an MOS transistor 11 in this first embodiment. However, in other embodiments, the switch unit 11 may also be other switching devices such as a relay. The MOS transistor 11 has a gate for receiving the PWM signal, a drain connected with the current generation unit 12, and a source connected to the ground. The MOS transistor 11 may be an NMOS transistor.

The current generation unit 12 includes a resistor RSET, an operational amplifier OP1 and an MOS transistor Q1. The resistor RSET has one end thereof connected to the drain of the MOS transistor 11 and the other end thereof connected to an inverting input terminal of the operational amplifier OP1 and a source of the MOS transistor Q1. The operational amplifier OP1 has a positive input terminal connected to a first reference voltage and an output terminal connected to a gate of the MOS transistor Q1. The first reference voltage is 1.2 V. The MOS transistor Q1 has a drain connected to the mirror current source 13.

The mirror current source 13 includes an MOS transistor Q2 and an MOS transistor Q3. The MOS transistor Q2 has a drain connected to the drain of the MOS transistor Q1. The drain and a gate of the MOS transistor Q2 are connected together through a conductor. A source and the gate of the MOS transistor Q2 are connected to a source and a gate of the MOS transistor Q3 respectively. The MOS transistor Q3 has a drain connected to the multi-path output unit 14.

The multi-path output unit 14 includes an operational amplifier OP2, an MOS transistor Q4 and a plurality of MOS transistors Q6. An inverting input terminal of the operational amplifier OP2 and a drain of the MOS transistor Q4 are connected to the drain of the MOS transistor Q3 respectively. An output terminal of the operational amplifier OP2 is connected to gates of the MOS transistor Q4 and the plurality of MOS transistors Q6 respectively. A positive input terminal of the operational amplifier OP2 is connected to a second reference voltage. The second reference voltage may be 0.3 V. A source of the MOS transistor Q4 and sources of the plurality of MOS transistors Q6 are connected to the source of the MOS transistor 11. The number of the MOS transistors Q6 is equal to that of the current balance units 15, and the plurality of MOS transistors Q6 have respective drains connected to the plurality of current balance units 15 respectively.

Each of the current balance units 15 includes an MOS transistor Q5 and an operational amplifier OP3. An inverting input terminal of the operational amplifier OP3 and a source of the MOS transistor Q5 are connected to the drain of one of the MOS transistors Q6, and an output terminal of the operational amplifier OP3 is connected to a gate of the MOS transistor Q5; and a positive input terminal of the operational amplifier OP3 is connected to the second reference voltage. A drain of the MOS transistor Q5 is connected to one of the LED lamp strings 16. The MOS transistors (11), Q1, Q2, Q3, Q4, Q5 and Q6 are all NMOS transistors.

Each of the LED lamp strings 16 has an anode which is used to receive an input voltage Vin and a cathode which is connected to one of the current balance units 15.

The PWM dimming circuit 10 may be an integrated circuit (IC), and the source of the MOS transistor Q1 is a reset terminal of the IC.

The operational principle of the PWM dimming circuit is as follows.

The MOS transistor 11 is turned on when the PWM signal is at a high level, and then the positive input terminal and the inverting input terminal of the operational amplifier OP1 in the current generation unit 12 are approximately short circuited because of the virtual short-circuit characteristics between the positive input terminal and the inverting input terminal. Therefore, the voltages of the inverting input terminal of the operational amplifier OP1 and the source of the MOS transistor Q1 may be regarded as 1.2 V. In addition, the voltage difference between the gate and the source of the MOS transistor Q1 meet the conditions for turning on the MOS transistor Q1, so the MOS transistor Q1 is turned on. The magnitude of the current flowing through the MOS transistor Q1 is 1.2 V/Rset (Rset is the resistance value of the resistor RSET). The MOS transistor Q2 and the MOS transistor Q3 form the mirror current source 13, which makes the magnitude of the current flowing through the MOS transistor Q1 the same as that of the current flowing through the MOS transistor Q4. Furthermore, as both the positive input terminals of the operational amplifiers OP2 and OP3 are connected to the reference voltage of 0.3 V, voltages of the inverting input terminals of the operational amplifiers OP2 and OP3 are also 0.3 V respectively because of the virtual short-circuit characteristics between the positive input terminal and the inverting input terminal. In addition, as the drains of the MOS transistors Q4 and Q6 are connected to the inverting input terminals of the operational amplifiers OP2 and OP3 respectively, the voltage of the drain of the MOS transistor Q4 is the same as that of the MOS transistor Q6. Furthermore, because a gate voltage and a source voltage of the MOS transistor Q4 are the same as those of the MOS transistor Q6, both impedances of and the magnitudes of the currents flowing through the MOS transistors Q4 and Q6 are the same as each other.

The MOS transistor Q5 of each of the current balance units 15 serves as a resistor, and the MOS transistor Q5 and one of the MOS transistors Q6 of the multi-path output unit 14 are connected in series to form a voltage divider for the LED lamp string 16. As a turn-on voltage drop Vf of each of the LED lamp strings 16 may be different from each other, the voltage of each of the current balance units 15 may be different because of the voltage drop of the same input voltage Vin across each of the LED lamp strings 16. However, the source voltage of the MOS transistor Q5 of each of the current balance units 15 is 0.3 V, so the operational amplifier OP3 will automatically adjust the resistor of the MOS transistor Q5 of each of the current balance units 15 by controlling the voltage of the output terminal thereof so that all the currents flowing through the LED lamp strings 16 connected in parallel are the same.

The MOS transistor 11 is turned off when the PWM signal is at a low level, and then no current will flow through the MOS transistor Q1. Likewise, the MOS transistor Q4 and the MOS transistor Q6 are turned off, so the LED lamp strings 16 will not emit light. Therefore, the PWM dimming circuit can adjust the duty ratio of the current flowing through each of the LED lamp strings 16 by adjusting the duty ratio of the PWM signal. In this way, the PWM dimming is achieved.

According to the PWM dimming circuit 10, dimming of an LED lamp string is achieved through use of a simple circuit without having to use the dimming module as in the prior art. This decreases both the difficulty in design of the circuit and the manufacturing cost. If the PWM dimming circuit 10 is packaged into an integrated circuit, volume of the PWM dimming circuit 10 will also be reduced to make it more convenient for use.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A pulse width modulation (PWM) dimming circuit, comprising a switch unit, a current generation unit, a mirror current source, a multi-path output unit, a plurality of current balance units and a plurality of LED lamp strings, wherein the switch unit is configured to receive a PWM signal and is controlled to turn on or off by the PWM signal; the current generation unit is connected with the switch unit and is configured to generate a current of a predetermined magnitude when the switch unit is turned on; the mirror current source is connected with the current generation unit and is configured to receive the current generated by the current generation unit and to generate a mirror current; the multi-path output unit is connected with the mirror current source and is configured to receive the mirror current and output the mirror current in multiple paths; the number of the current balance units is equal to that of the LED lamp strings, and the plurality of current balance units are connected between the multi-path output unit and the plurality of LED lamp strings respectively and are configured to adjust respective resistances to keep balance of currents among the LED lamp strings; the current generation unit comprises a resistor (RSET), an operational amplifier (OP1) and a metal oxide semiconductor (MOS) transistor (Q1); the resistor (RSET) has one end thereof connected to the switch unit and the other end thereof connected to an inverting input terminal of the operational amplifier (OP1) and a source of the MOS transistor (Q1); the operational amplifier (OP1) has a positive input terminal connected to a first reference voltage and an output terminal connected to a gate of the MOS transistor (Q1); and the MOS transistor (Q1) has a drain connected to the mirror current source.

2. The PWM dimming circuit of claim 1, wherein the switch unit is a metal oxide semiconductor (MOS) transistor or a relay.

3. The PWM dimming circuit of claim 2, wherein the switch unit is an MOS transistor (11) which has a gate for receiving the PWM signal, a drain connected with the current generation unit, and a source connected to the ground.

4. The PWM dimming circuit of claim 1, wherein the mirror current source comprises an MOS transistor (Q2) and an MOS transistor (Q3); the MOS transistor (Q2) has a drain connected to the drain of the MOS transistor (Q1); the MOS transistor (Q2) has a source and a gate connected to a source and a gate of the MOS transistor (Q3) respectively; the MOS transistor (Q3) has a drain connected to the multi-path output unit; and the drain and the gate of the MOS transistor (Q2) are connected together through a conductor.

5. The PWM dimming circuit of claim 4, wherein the multi-path output unit comprises an operational amplifier (OP2), an MOS transistor (Q4) and a plurality of MOS transistors (Q6); an inverting input terminal of the operational amplifier (OP2) and a drain of the MOS transistor (Q4) are connected to the drain of the MOS transistor (Q3) respectively; an output terminal of the operational amplifier (OP2) is connected to gates of the MOS transistor (Q4) and the plurality of MOS transistors (Q6) respectively; a positive input terminal of the operational amplifier (OP2) is connected to a second reference voltage; a source of the MOS transistor (Q4) and sources of the plurality of MOS transistors (Q6) are connected to the source of the MOS transistor (11) in the switch unit respectively; and the number of the MOS transistors (Q6) is equal to that of the current balance units, and the plurality of MOS transistors (Q6) have respective drains connected to the plurality of current balance units respectively.

6. The PWM dimming circuit of claim 5, wherein each of the current balance units includes an MOS transistor (Q5) and an operational amplifier (OP3); an inverting input terminal of the operational amplifier (OP3) and a source of the MOS transistor (Q5) are connected to the drain of one of the MOS transistors (Q6), and an output terminal of the operational amplifier (OP3) is connected to a gate of the MOS transistor (Q5); and a positive input terminal of the operational amplifier (OP3) is connected to the second reference voltage, and a drain of the MOS transistor (Q5) is connected to one of the LED lamp strings.

7. The PWM dimming circuit of claim 6, wherein the MOS transistors (11), (Q1), (Q2), (Q3), (Q4), (Q5) and (Q6) are all NMOS transistors.

8. The PWM dimming circuit of claim 6, wherein the first reference voltage is 1.2 V and the second reference voltage is 0.3 V.

9. The PWM dimming circuit of claim 5, wherein the first reference voltage is 1.2 V and the second reference voltage is 0.3 V.

10. The PWM dimming circuit of claim 1, wherein the PWM dimming circuit is an integrated circuit (IC), and the source of the MOS transistor (Q1) is a reset terminal of the IC.

11. A pulse width modulation (PWM) dimming circuit, comprising a switch unit, a current generation unit, a mirror current source, a multi-path output unit, a plurality of current balance units and a plurality of LED lamp strings, wherein the switch unit is a metal oxide semiconductor (MOS) transistor (11) which has a gate for receiving a PWM signal, a drain connected with the current generation unit, and a source connected to the ground, and the switch unit is controlled to turn on or off by the PWM signal; the current generation unit is connected with the switch unit and is configured to generate a current of a predetermined magnitude when the switch unit is turned on; the mirror current source is connected with the current generation unit and is configured to receive the current generated by the current generation unit and to generate a mirror current; the multi-path output unit is connected with the mirror current source and is configured to receive the mirror current and output the mirror current in multiple paths; the number of the current balance units is equal to that of the LED lamp strings, and the plurality of current balance units are connected between the multi-path output unit and the plurality of LED lamp strings respectively and are configured to adjust respective resistances to keep balance of currents among the LED lamp strings; the current generation unit comprises a resistor (RSET), an operational amplifier (OP1) and a MOS transistor (Q1); the resistor (RSET) has one end thereof connected to the switch unit and the other end thereof connected to an inverting input terminal of the operational amplifier (OP1) and a source of the MOS transistor (Q1); the operational amplifier (OP1) has a positive input terminal connected to a first reference voltage and an output terminal connected to a gate of the MOS transistor (Q1); and the MOS transistor (Q1) has a drain connected to the mirror current source.

12. The PWM dimming circuit of claim 11, wherein the mirror current source comprises an MOS transistor (Q2) and an MOS transistor (Q3); the MOS transistor (Q2) has a drain connected to the drain of the MOS transistor (Q1); the MOS transistor (Q2) has a source and a gate connected to a source and a gate of the MOS transistor (Q3) respectively; the MOS transistor (Q3) has a drain connected to the multi-path output unit; and the drain and the gate of the MOS transistor (Q2) are connected together through a conductor.

13. The PWM dimming circuit of claim 12, wherein the multi-path output unit comprises an operational amplifier (OP2), an MOS transistor (Q4) and a plurality of MOS transistors (Q6); an inverting input terminal of the operational amplifier (OP2) and a drain of the MOS transistor (Q4) are connected to the drain of the MOS transistor (Q3) respectively; an output terminal of the operational amplifier (OP2) is connected to gates of the MOS transistor (Q4) and the plurality of MOS transistors (Q6) respectively; a positive input terminal of the operational amplifier (OP2) is connected to a second reference voltage; a source of the MOS transistor (Q4) and sources of the plurality of MOS transistors (Q6) are connected to the source of the MOS transistor (11) in the switch unit respectively; and the number of the MOS transistors (Q6) is equal to that of the current balance units, and the plurality of MOS transistors (Q6) have respective drains connected to the plurality of current balance units respectively.

14. The PWM dimming circuit of claim 13, wherein each of the current balance units includes an MOS transistor (Q5) and an operational amplifier (OP3); an inverting input terminal of the operational amplifier (OP3) and a source of the MOS transistor (Q5) are connected to the drain of one of the MOS transistors (Q6), and an output terminal of the operational amplifier (OP3) is connected to a gate of the MOS transistor (Q5); and a positive input terminal of the operational amplifier (OP3) is connected to the second reference voltage, and a drain of the MOS transistor (Q5) is connected to one of the LED lamp strings.

15. The PWM dimming circuit of claim 14, wherein the MOS transistors (11), (Q1), (Q2), (Q3), (Q4), (Q5) and (Q6) are all NMOS transistors.

16. The PWM dimming circuit of claim 14, wherein the first reference voltage is 1.2 V and the second reference voltage is 0.3 V.

17. The PWM dimming circuit of claim 13, wherein the first reference voltage is 1.2 V and the second reference voltage is 0.3 V.

18. The PWM dimming circuit of claim 11, wherein the PWM dimming circuit is an IC, and the source of the MOS transistor (Q1) is a reset terminal of the IC.

* * * * *